United States Patent
Wang et al.

(10) Patent No.: US 12,531,695 B2
(45) Date of Patent: Jan. 20, 2026

(54) METHODS AND DEVICES FOR ENHANCING SOUNDING REFERENCE SIGNAL TRANSMISSION

(71) Applicant: ZTE Corporation, Shenzhen (CN)

(72) Inventors: Yuxin Wang, Shenzhen (CN); Zhaohua Lu, Shenzhen (CN); Hao Wu, Shenzhen (CN); Yu Ngok Li, Shenzhen (CN); Chuangxin Jiang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 400 days.

(21) Appl. No.: 18/098,774

(22) Filed: Jan. 19, 2023

(65) Prior Publication Data

US 2023/0163917 A1    May 25, 2023

Related U.S. Application Data

(63) Continuation of application No. PCT/CN2020/109113, filed on Aug. 14, 2020.

(51) Int. Cl.
*H04L 5/00* (2006.01)
*H04W 72/23* (2023.01)
*H04W 72/232* (2023.01)

(52) U.S. Cl.
CPC .......... *H04L 5/0051* (2013.01); *H04W 72/232* (2023.01)

(58) Field of Classification Search
CPC ............................ H04L 5/0051; H04W 72/232
See application file for complete search history.

(56) References Cited

U.S. PATENT DOCUMENTS

| 2008/0285512 A1* | 11/2008 | Pan ........................ H04L 1/0025 |
| 2014/0269451 A1* | 9/2014 | Papasakellariou .... H04L 5/0053 |
| 2015/0124673 A1* | 5/2015 | Ouchi .................... H04W 52/58 |
| 2017/0264402 A1 | 9/2017 | Papasakellariou |

(Continued)

FOREIGN PATENT DOCUMENTS

| CN | 102469607 A | 5/2012 |
| CN | 102939731 A | 2/2013 |

(Continued)

OTHER PUBLICATIONS

ZTE, "Enhancements on SRS flexibility, coverage and capacity," 3GPP TSG RAN WG1 Meeting #102-e, R1-2006963-R1-2005459, eMeeting, Aug. 17-28, 2020.

(Continued)

*Primary Examiner* — Ronald B Abelson
(74) *Attorney, Agent, or Firm* — Crowell & Moring LLP

(57) ABSTRACT

The present disclosure describes methods, systems and devices for enhancing sounding reference signal (SRS) transmission for a user equipment (UE). One method includes receiving, by the UE, downlink control information (DCI) via a physical downlink control channel (PDCCH) from a network base station, the DCI configured to trigger the SRS transmission according to at least one parameter of the SRS transmission. Another method includes sending, by a network base station to the UE, downlink control information (DCI) via a physical downlink control channel (PDCCH), the DCI configured to trigger the SRS transmission according to at least one parameter of the SRS transmission.

18 Claims, 5 Drawing Sheets

(56) References Cited

U.S. PATENT DOCUMENTS

| | | | | |
|---|---|---|---|---|
| 2017/0288833 | A1* | 10/2017 | Islam | H04W 72/04 |
| 2019/0174466 | A1* | 6/2019 | Zhang | H04L 5/0057 |
| 2019/0327115 | A1 | 10/2019 | Zhang et al. | |
| 2021/0051759 | A1* | 2/2021 | Zhou | H04W 52/0206 |
| 2021/0184824 | A1* | 6/2021 | Kwak | H04L 5/0094 |

FOREIGN PATENT DOCUMENTS

| | | |
|---|---|---|
| CN | 106506127 A | 3/2017 |
| CN | 107294686 A | 10/2017 |
| WO | WO 2020/155362 A1 | 8/2020 |

OTHER PUBLICATIONS

Qualcomm Incorporated, "Enhancements on SRS flexibility, coverage and capacity," 3GPP TSG-RAN WG1 Meeting #102-e, R1-2006795, eMeeting, Aug. 17-28, 2020.

NTT Docomo Inc., "Discussion on SRS enhancement," 3GPP TSG RAN WG1 #102-e, R1-2006723, eMeeting, Aug. 17-28, 2020.

Ericsson, "SRS Performance and Potential Enhancements," 3GPP TSG-RAN WG1 Meeting #102-e, Tdoc R1-2006610, eMeeting, Aug. 17-28, 2020.

CMCC, "Enhancements on SRS flexibility, coverage and capacity," 3GPP TSG RAN WG1 #102e, R1-2006205, eMeeting, Aug. 17-28, 2020.

Samsung, "Enhancements on SRS," 3GPP TSG RAN WG1 #102-e, R1-2006133, eMeeting, Aug. 17-28, 2020.

OPPO, "Enhancements on SRS flexibility, coverage and capacity," 3GPP TSG RAN WG1 #102-e, R1-2005988, eMeeting, Aug. 17-28, 2020.

Intel Corporation, "Discussion on SRS enhancements," 3GPP TSG RAN WG1 Meeting #102-e, R1-2005863, eMeeting, Aug. 17-28, 2020.

CATT, "Discussion on enhancements on SRS flexibility, coverage and capacity," 3GPP TSG RAN WG1 #102-e, R1-2005688, eMeeting, Aug. 17-28, 2020.

Sony, "Considerations on SRS flexibility, coverage and capacity," 3GPP TSG RAN WG1 Meeting #102-e, R1-2005565, eMeeting, Aug. 17-28, 2020.

InterDigital Inc., "Discussion on SRS Enhancements," 3GPP TSG RAN WG1 #102-e, R1-2005487, eMeeting, Aug. 17-28, 2020.

Vivo, "Discussion on SRS enhancement," 3GPP TSG RAN WG1 #102-e, R1-2005368, eMeeting, Aug. 17-28, 2020.

FUTUREWEI, "Sounding enhancement for interference probing in TDD cooperative MIMO," 3GPP TSG RAN WG1 #102-e, R1-2005291, eMeeting, Aug. 17-28, 2020.

Huawei | HiSilicon, "Enhancements on SRS for Rel-17," 3GPP TSG RAN WG1 Meeting #102-e, R1-2005247, eMeeting, Aug. 17-28, 2020.

Huawei | HiSilicon, "Discussion on SRS spatial relation configuration," 3GPP TSG RAN WG2 #110-e, R2-2005093, Electronic meeting, Jun. 1-12, 2020.

Ericsson, "Configuration of SRS Carrier Switching," 3GPP TSG-RAN WG2 #110e, Tdoc R2-2005072, Electronic meeting, Jun. 1-12, 2020.

Chinese Office Action with English Translation, Aug. 28, 2024, pp. 1-20, issued in Chinese Application No. 202080104297.X, State Intellectual Property Office.

International Search Report and Written Opinion regarding PCT/CN2020/109113 dated Apr. 26, 2021.

OPPO, "Text proposal for SRS," 1-30 *3GPP TSG RAN WG1 Meeting AH 1801 RI-1800485,* Jan. 26, 2018.

Extended European Search Report regarding EP 20 94 9119 dated Jul. 14, 2023, 7 pages.

* cited by examiner

400

> receiving, by the UE, downlink control information (DCI) via a physical downlink control channel (PDCCH) from a network base station, the DCI configured to trigger the SRS transmission according to at least one parameter of the SRS transmission
>
> 410

> sending, by a network base station to the UE, downlink control information (DCI) via a physical downlink control channel (PDCCH), the DCI configured to trigger the SRS transmission according to at least one parameter of the SRS transmission
>
> 510

FIG. 5

METHODS AND DEVICES FOR ENHANCING SOUNDING REFERENCE SIGNAL TRANSMISSION

CROSS-REFERENCE TO RELATED APPLICATION

This application is a continuation application of PCT International Patent Application No. PCT/CN2020/109113, filed with the China National Intellectual Property Administration, PRC on Aug. 14, 2020, which is herein incorporated by reference in its entirety.

TECHNICAL FIELD

The present disclosure is directed generally to wireless communications. Particularly, the present disclosure relates to methods and devices for enhancing sounding reference signal (SRS) transmission.

BACKGROUND

Wireless communication technologies are moving the world toward an increasingly connected and networked society. High-speed and low-latency wireless communications rely on efficient network resource management and allocation between user equipment and wireless access network nodes (including but not limited to wireless base stations). A new generation network is expected to provide high speed, low latency and ultra-reliable communication capabilities and fulfil the requirements from different industries and users. A sounding reference signal (SRS) may be transmitted between a user equipment and a base station to provide a means for the network to estimate state of channels for better communication. There are some issues and/or problems associated with scheduling the SRS transmission. The present disclosure may address at least some of issues/problems associated with the existing system to improve the performance of the wireless communication.

SUMMARY

This document relates to methods, systems, and devices for wireless communication, and more specifically, for enhancing sounding reference signal (SRS) transmission.

In one embodiment, the present disclosure describes a method for wireless communication. The method includes enhancing sounding reference signal (SRS) transmission for a user equipment (UE) by receiving, by the UE, downlink control information (DCI) via a physical downlink control channel (PDCCH) from a network base station, the DCI configured to trigger the SRS transmission according to at least one parameter of the SRS transmission.

In another embodiment, the present disclosure describes a method for wireless communication. The method includes enhancing sounding reference signal (SRS) transmission for a user equipment (UE) by sending, by a network base station to the UE, downlink control information (DCI) via a physical downlink control channel (PDCCH), the DCI configured to trigger the SRS transmission according to at least one parameter of the SRS transmission.

In some other embodiments, an apparatus for wireless communication may include a memory storing instructions and a processing circuitry in communication with the memory. When the processing circuitry executes the instructions, the processing circuitry is configured to carry out the above methods.

In some other embodiments, a device for wireless communication may include a memory storing instructions and a processing circuitry in communication with the memory. When the processing circuitry executes the instructions, the processing circuitry is configured to carry out the above methods.

In some other embodiments, a computer-readable medium comprising instructions which, when executed by a computer, cause the computer to carry out the above methods.

The above and other aspects and their implementations are described in greater detail in the drawings, the descriptions, and the claims.

BRIEF DESCRIPTION OF THE DRAWINGS

FIG. 4 shows a flow diagram of a method for wireless communication.

FIG. 5 shows a flow diagram of another method for wireless communication.

DETAILED DESCRIPTION

Figure 1:
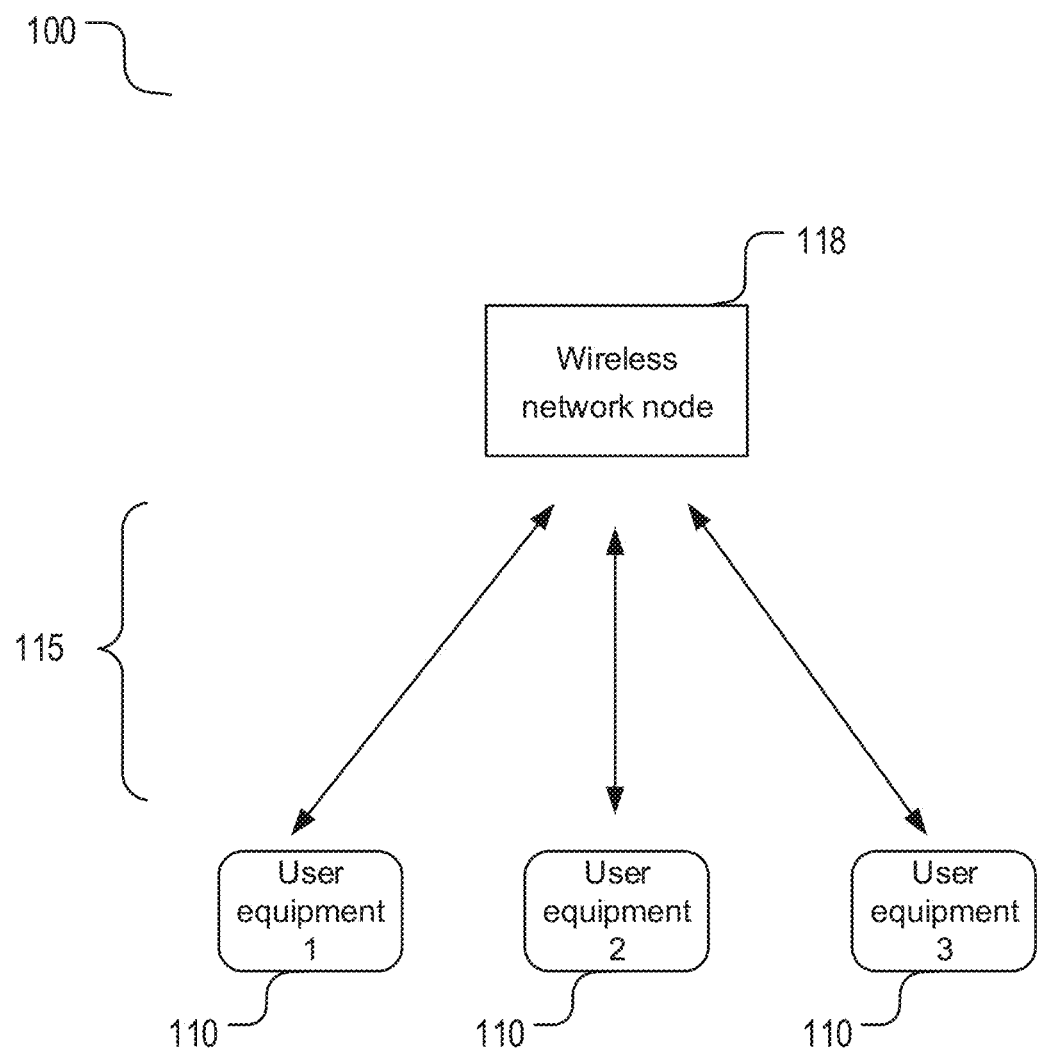
FIG. 1 shows an example of a wireless communication system include one wireless network node and one or more user equipment.

The present disclosure will now be described in detail hereinafter with reference to the accompanied drawings, which form a part of the present disclosure, and which show, by way of illustration, specific examples of embodiments. Please note that the present disclosure may, however, be embodied in a variety of different forms and, therefore, the covered or claimed subject matter is intended to be construed as not being limited to any of the embodiments to be set forth below.

Throughout the specification and claims, terms may have nuanced meanings suggested or implied in context beyond an explicitly stated meaning. Likewise, the phrase "in one embodiment" or "in some embodiments" as used herein does not necessarily refer to the same embodiment and the phrase "in another embodiment" or "in other embodiments" as used herein does not necessarily refer to a different embodiment. The phrase "in one implementation" or "in some implementations" as used herein does not necessarily refer to the same implementation and the phrase "in another implementation" or "in other implementations" as used herein does not necessarily refer to a different implementation. It is intended, for example, that claimed subject matter includes combinations of exemplary embodiments or implementations in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" or "at least one" as used herein, depending at least in part upon context, may be used to describe any feature, structure, or characteristic in a singular sense or may be used to describe combinations of features, structures or characteristics in a plural sense. Similarly, terms, such as "a", "an", or "the", again, may be understood to convey a singular usage or to convey a plural usage, depending at least in part upon context. In addition, the term "based on" or "determined by" may be understood as not necessarily intended to convey an exclusive set of factors and may, instead, allow for existence of additional factors not necessarily expressly described, again, depending at least in part on context.

The present disclosure describes methods and devices for enhancing sounding reference signal (SRS) transmission.

New generation (NG) mobile communication system are moving the world toward an increasingly connected and networked society. High-speed and low-latency wireless communications rely on efficient network resource management and allocation between user equipment and wireless access network nodes (including but not limited to wireless base stations). A new generation network is expected to provide high speed, low latency and ultra-reliable communication capabilities and fulfil the requirements from different industries and users.

The 4th Generation mobile communication technology (4G) Long-Term Evolution (LTE) or LTE-Advance (LTE-A) and the 5th generation mobile communication technology (5G) face more and more demands. Based on the developing trend, 4G and 5G systems may develop supports on features of enhanced mobile broadband (eMBB), ultra-reliable low-latency communication (URLLC), and massive machine-type communication (mMTC).

Sounding reference signal (SRS) transmission between a user equipment (UE) and a wireless network node may be used to obtain downlink (DL) channel state information (CSI) and/or uplink (UL) CSI, which may enable outstanding downlink and/or uplink performance. For example, for time division duplex (TDD) systems with antenna calibration, channel reciprocity may be used to measure DL CSI based on the uplink SRS measurement, and then to enable multiple input multiple output (MIMO) performance, assist DL beamforming, and/or assist DL precoding.

Uplink sounding reference signal (SRS) may be a user-equipment specific signal and transmitted from a user equipment (UE) to a wireless network node. With potentially large number of active UEs in a cell serviced by the wireless network node as well as mobility of these large number of active UEs, SRS capacity may be an issue.

Considering the transmission power of UEs is generally much lower than the transmission power of the wireless network node, UEs may be restricted on allocating transmit power to SRS recourse. A relatively low power may result in a relatively low signal to interference and noise ratio (SINR), which may lead to poor measurements of uplink CSI and/or downlink CSI. The present disclosure describes one or more embodiments to address at least one or more issues discussed above.

In a system of new radio (NR) access, a growing number of UEs may locate in serving cell and receive signal from the wireless network node, or transmit signal to the wireless network node. For the transmission of aperiodic SRS, there may be some issues/problems with the existing system wherein collision may occur between SRS transmission from different UEs. In the present disclosure, various embodiments are described to improve the flexibility of SRS transmission, enhancing SRS transmission.

In a NR wireless system, SRS may be a signal used for measuring CSI of a channel between the communication node (e.g., a network base station) and the communication terminal device (e.g., a UE). In the LTE system, the communication terminal device regularly transmits a UL SRS on the last data symbol of a sub-frame based on parameters (e.g., frequency band, frequency domain position, sequence cyclic shift, period, sub-frame offset, . . . , etc.) indicated by the communication node. The communication node determines CSI of UL channels of the UE based on the received SRS and performs operations (e.g., frequency selection scheduling and close-loop power control) according to the determined CSI.

According to new development of LTE, non-precoding SRS(s) may be used in UL communications (i.e., antenna dedicated SRS) and de-modulation reference signal (DMRS) of a physical UL shared channel (PUSCH) may perform precoding. By receiving the non-precoding SRS, the communication node may estimate original CSI, which may not be acquired based on the precoding DMRS. Under such a condition, the communication terminal device may require more SRS resources when using multiple antennas to transmit non-precoding SRSs, resulting in the number of communication terminal devices simultaneously multiplexing in the system decreasing. The communication terminal device may transmit the SRS configured by the higher layer signaling (type-0 trigger) or the downlink control information (DCI) (type-1 trigger). The SRS transmissions configured by the higher layer signaling are periodic and the SRS transmissions configured by the DCI are aperiodic. LTE-A release 10 adds the aperiodic SRS, and a utilization of the SRS resources and a flexibility of scheduling the SRS may be improved to some extent.

According to new radio (NR) release 15, usages of the SRS may be classified into the following categories: beam management, codebook based, non-codebook-based, and antenna switching. NR supports beam indication by informing UE that a certain PDSCH and/or PDCCH transmission may use the same transmission beam as a configured reference signal (CSI-RS or synchronization signal (SS) block). More formally, it may imply informing the device that a certain PDSCH and/or PDCCH is transmitted using the same spatial filter as the configured reference signal. In more detail, beam indication may be based on the configuration and downlink signaling of transmission configuration indication (TCI) states. Each TCI state may include, among other things, information about a reference signal (a CSI-RS or an SS block). By associating a certain downlink transmission (PDCCH or PDSCH) with a certain TCI, the network may inform the device that it may assume that the downlink transmission is done using the same spatial filter as the reference signal associated with that TCI.

The present disclosure describes various embodiments for enhancing SRS transmission between a UE and a wireless network. In one implementation, the wireless network may comprises at least one of a base station in a macrocell, a base station or a transmission point in a small cell, a transmission point in a high frequency communication system, a transmission point in an internet of things, a satellite transmission point, and the like. In another implementation, the UE may include at least one of a smartphone, a portable device, a vehicle, a transmission point in a communication system (e.g., a satellite communication system), and the like.

FIG. 1 shows a wireless communication system 100 including a wireless network node 118 and one or more user equipment (UE) 110. The wireless network node may include a network base station, which may be a nodeB (NB, e.g., a gNB) in a mobile telecommunications context. Each of the UE may wirelessly communicate with the wireless network node via one or more radio channels 115. For example, a first UE 110 may wirelessly communicate with a wireless network node 118 via a channel including a plurality of radio channels during a certain period of time. The network base station 118 may send high layer signaling to the UE 110. The high layer signaling may include configuration information for communication between the UE and the base station. In one implementation, the high layer signaling may include a radio resource control (RRC) message.

Figure 2:
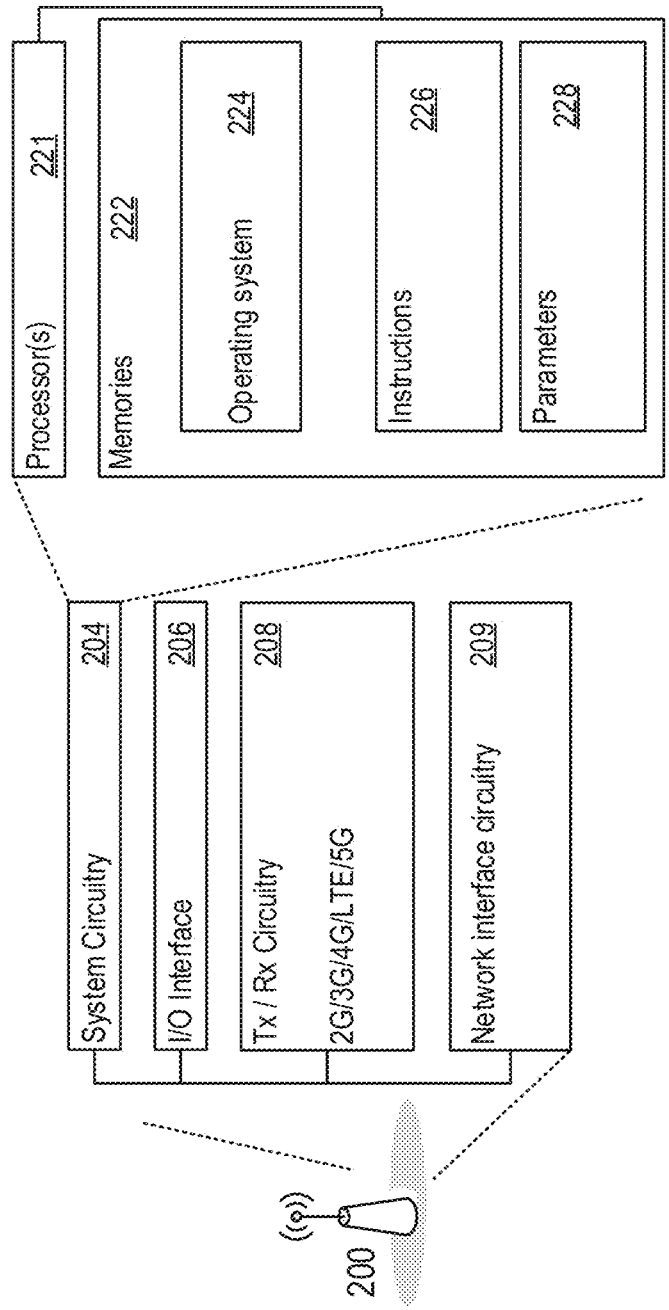
FIG. 2 shows an example of a network node.

FIG. 2 shows an example of electronic device 200 to implement a network base station. The example electronic device 200 may include radio transmitting/receiving (Tx/Rx) circuitry 208 to transmit/receive communication with UEs and/or other base stations. The electronic device 200 may also include network interface circuitry 209 to communicate the base station with other base stations and/or a core network, e.g., optical or wireline interconnects, Ethernet, and/or other data transmission mediums/protocols. The electronic device 200 may optionally include an input/output (I/O) interface 206 to communicate with an operator or the like.

The electronic device 200 may also include system circuitry 204. System circuitry 204 may include processor(s) 221 and/or memory 222. Memory 222 may include an operating system 224, instructions 226, and parameters 228. Instructions 226 may be configured for the one or more of the processors 124 to perform the functions of the network node. The parameters 228 may include parameters to support execution of the instructions 226. For example, parameters may include network protocol settings, bandwidth parameters, radio frequency mapping assignments, and/or other parameters.

Figure 3:
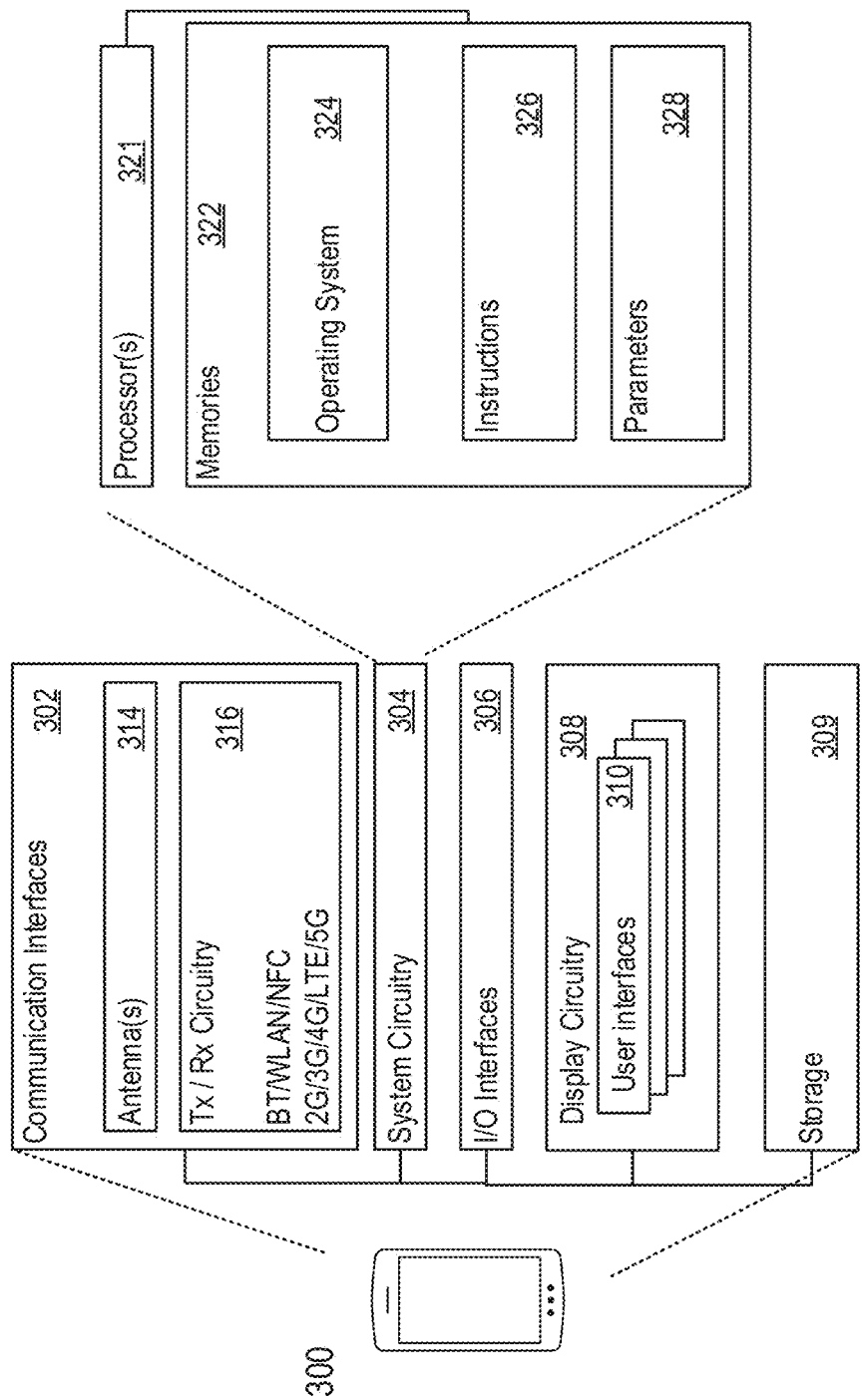
FIG. 3 shows an example of a user equipment.

FIG. 3 shows an example of an electronic device to implement a terminal device 300 (for example, user equipment (UE)). The UE 300 may be a mobile device, for example, a smart phone or a mobile communication module disposed in a vehicle. The UE 300 may include communication interfaces 302, a system circuitry 304, an input/output interfaces (I/O) 306, a display circuitry 308, and a storage 309. The display circuitry may include a user interface 310. The system circuitry 304 may include any combination of hardware, software, firmware, or other logic/circuitry. The system circuitry 304 may be implemented, for example, with one or more systems on a chip (SoC), application specific integrated circuits (ASIC), discrete analog and digital circuits, and other circuitry. The system circuitry 304 may be a part of the implementation of any desired functionality in the UE 300. In that regard, the system circuitry 304 may include logic that facilitates, as examples, decoding and playing music and video, e.g., MP3, MP4, MPEG, AVI, FLAC, AC3, or WAV decoding and playback; running applications; accepting user inputs; saving and retrieving application data; establishing, maintaining, and terminating cellular phone calls or data connections for, as one example, internet connectivity; establishing, maintaining, and terminating wireless network connections, Bluetooth connections, or other connections; and displaying relevant information on the user interface 310. The user interface 310 and the inputs/output (I/O) interfaces 306 may include a graphical user interface, touch sensitive display, haptic feedback or other haptic output, voice or facial recognition inputs, buttons, switches, speakers and other user interface elements. Additional examples of the I/O interfaces 306 may include microphones, video and still image cameras, temperature sensors, vibration sensors, rotation and orientation sensors, headset and microphone input/output jacks, Universal Serial Bus (USB) connectors, memory card slots, radiation sensors (e.g., IR sensors), and other types of inputs.

Referring to FIG. 3, the communication interfaces 302 may include a Radio Frequency (RF) transmit (Tx) and receive (Rx) circuitry 316 which handles transmission and reception of signals through one or more antennas 314. The communication interface 302 may include one or more transceivers. The transceivers may be wireless transceivers that include modulation/demodulation circuitry, digital to analog converters (DACs), shaping tables, analog to digital converters (ADCs), filters, waveform shapers, filters, pre-amplifiers, power amplifiers and/or other logic for transmitting and receiving through one or more antennas, or (for some devices) through a physical (e.g., wireline) medium. The transmitted and received signals may adhere to any of a diverse array of formats, protocols, modulations (e.g., QPSK, 16-QAM, 64-QAM, or 256-QAM), frequency channels, bit rates, and encodings. As one specific example, the communication interfaces 302 may include transceivers that support transmission and reception under the 2G, 3G, BT, WiFi, Universal Mobile Telecommunications System (UMTS), High Speed Packet Access (HSPA)+, 4G/Long Term Evolution (LTE), and 5G standards. The techniques described below, however, are applicable to other wireless communications technologies whether arising from the 3rd Generation Partnership Project (3GPP), GSM Association, 3GPP2, IEEE, or other partnerships or standards bodies.

Referring to FIG. 3, the system circuitry 304 may include one or more processors 321 and memories 322. The memory 322 stores, for example, an operating system 324, instructions 326, and parameters 328. The processor 321 is configured to execute the instructions 326 to carry out desired functionality for the UE 300. The parameters 328 may provide and specify configuration and operating options for the instructions 326. The memory 322 may also store any BT, WiFi, 3G, 4G, 5G or other data that the UE 300 will send, or has received, through the communication interfaces 302. In various implementations, a system power for the UE 300 may be supplied by a power storage device, such as a battery or a transformer.

The present disclosure describes several below embodiments, which may be implemented, partly or totally, on the network base station and/or the user equipment described above in FIGS. 2-3.

Referring to FIG. 4, the present disclosure describes embodiments of a method 400 for enhancing sounding reference signal (SRS) transmission for a user equipment (UE). The method 400 may include step 410: receiving, by the UE, downlink control information (DCI) via a physical downlink control channel (PDCCH) from a network base station, the DCI configured to trigger the SRS transmission according to at least one parameter of the SRS transmission.

Referring to FIG. 5, the present disclosure describes embodiments of a method 500 for enhancing sounding reference signal (SRS) transmission for a user equipment (UE). The method 500 may include step 510: sending, by a network base station to the UE, downlink control information (DCI) via a physical downlink control channel (PDCCH), the DCI configured to trigger the SRS transmission according to at least one parameter of the SRS transmission.

In various implementations of various embodiments, the SRS transmission may be an a period SRS transmission. The DCI may include a value of a field of uplink-shared channel (UL-SCH) being equal to "0" and without a channel state information (CSI) request. In another implementation, the DCI may include the value of the field of UL-SCH being equal to "0" and with the CSI request.

In one embodiment, to improve the flexibility of SRS transmission, one or more parameters of SRS transmission may be indicated by the DCI. The DCI format may be used for scheduling physical uplink shared channel (PUSCH).

Optionally in one implementation of the embodiment, the one or more parameters of SRS transmission may include at least one of following parameters: a cyclic shift, a transmission comb offset, a transmission power control (TPC) command, a slot offset for SRS transmission, a time domain position of SRS resource, a frequency domain position of SRS resource, a set of component carrier (CC) or a set of serving cell for SRS transmission, a transmission configuration indication for SRS, or a spatial relation information for SRS transmission.

Optionally in another implementation, for example but not limited to, at least one of following field in the DCI may be used to indicate whether the one or more parameters of SRS transmission are indicated by the DCI or not.

In method 1, one bit in the DCI may be used to indicate whether the one or more parameters of SRS transmission are indicated by the DCI or not. In one implementation, the one bit may be a field that is newly added in the DCI. In another implementation, the one bit may be an existing filed in the DCI, which may include one of following field: a field of uplink/supplementary uplink (UL/SUL) indicator, a field of frequency hopping flag, a field of a priority indicator, a field of invalid symbol pattern indicator, or a field of minimum applicable scheduling offset indicator. For one example, a value of "1" in the field may indicate the above parameters of SRS transmission are indicated by the DCI, and a value of "0" may indicate the above parameters of SRS transmission are configured by higher layer parameters (e.g., a RRC message). For another example, a value of "0" may indicate the above parameters of SRS transmission are indicated by the DCI, and a value of "1" may indicate the above parameters of SRS transmission are configured by higher layer parameters.

In method 2, a DCI format with cyclic redundancy check (CRC) scrambled by a predefined radio network temporary identifier (RNTI) may be used to indicate whether the one or more parameters of SRS transmission are indicated by the DCI or not. For example but not limited to, the predefined RNTI may include a dedicated SRS RNTI (D-SRS-RNTI).

In method 3, a field of modulation and coding scheme in the DCI may be used to indicate whether the one or more parameters of SRS transmission are indicated by the DCI or not. For example, when the value of the field of modulation and coding scheme is non equal to "00000", the field of modulation and coding scheme in the DCI may indicate that the parameters of SRS transmission are indicated by DCI, otherwise the parameters of SRS transmission are configured by higher layer parameters. For another example, when the value of the field of modulation and coding scheme is equal to "00000", the field of modulation and coding scheme in the DCI may indicate that the parameters of SRS transmission are indicated by DCI, otherwise the parameters of SRS transmission are configured by higher layer parameters.

Optionally and/or alternatively in another embodiment, to improve the flexibility of SRS transmission, one or more parameters of SRS transmission may be indicated by a DCI, where the DCI format may be used for scheduling of PUSCH. In one implementation, the one or more parameters of SRS transmission may include at least one of following parameters: a cyclic shift, a transmission comb offset, a transmission power control (TPC) command, a slot offset for SRS transmission, a time domain position of SRS resource, a frequency domain position of SRS resource, a set of component carrier (CC) or a set of serving cell for SRS transmission, a transmission configuration indication for SRS, or a spatial relation information for SRS transmission.

Optionally in one implementation, for example but not limited to, the DCI comprises at least one of the following fields to indicate the at least one parameter of the SRS transmission: a field of modulation and coding scheme used to indicate a slot offset for SRS transmission, a field of hybrid automatic repeat request (HARQ) process number used to indicate a cyclic shift for SRS sequence, a field of frequency domain resource assignment used to indicate a frequency domain position of SRS, a field of time domain resource assignment used to indicate at least one parameter of a time domain position of SRS, a field of antenna ports or precoding information and number of layers used to indicate a transmission configuration indication, a field of redundancy version used to indicate a transmission comb offset, a field of carrier indicator used to indicate a set of component carrier (CC) or a set of serving cell for SRS transmission, or a field of TPC command for scheduled physical uplink shared channel (PUSCH) used to indicate a TPC command for SRS. In another implementation, the at least one parameter of the time domain position of SRS comprises at least one of following parameters: a start position of SRS resource, a number of symbols of SRS resource, or a repetition factor in SRS resource. Optionally in another implementation, the transmission configuration indication is used to select a configuration of spatial relation information for SRS transmission.

Figure 6:
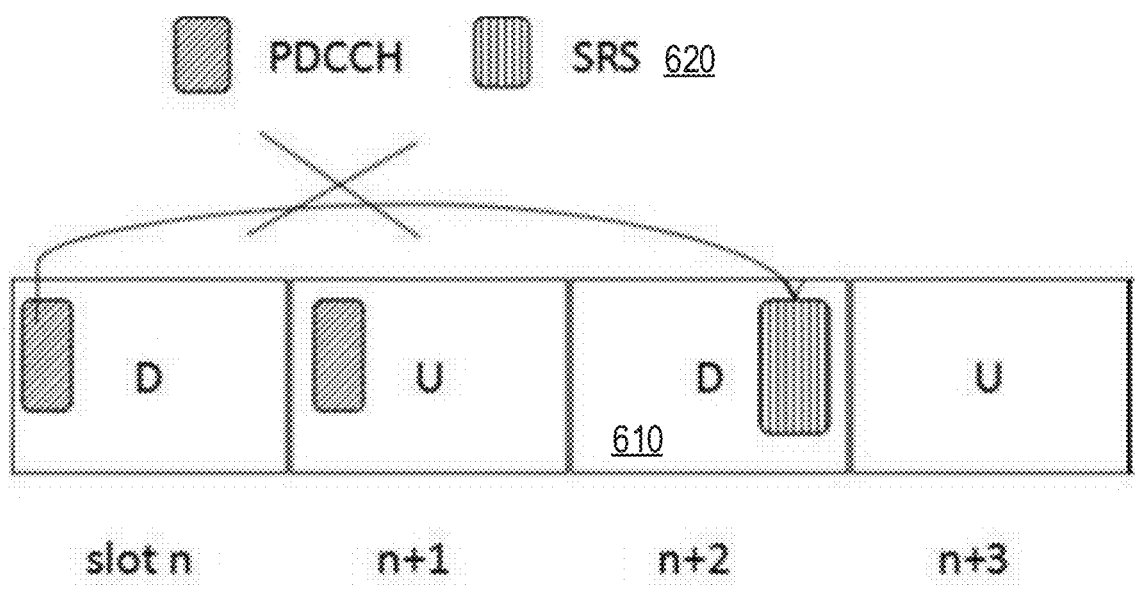
FIG. 6 shows an issue or problem to be solved in a wireless communication system.

Referring to FIG. 6, a slot 610 with an offset of 2 is configured in an aperiodic SRS resource set for a UE by a higher layer RRC signaling, and the slot 610 which is indicated by the slot offset may have been modified to downlink slot by the DCI which is used for notifying the slot format, As a result of this issue/problem, the UE may not transmit aperiodic SRS 620.

Optionally and/or alternatively, another embodiment is described at least for solving the above issue/problem. When an a period SRS is triggered by a DCI with UL-SCH=0 and without or with a CSI request, the slot offset may be indicated by one of following field in the DCI: a field of modulation and coding scheme, a field of HARQ process number, a field of SRS resource indicator, a field of frequency domain resource assignment, a field of time domain resource assignment, a field of first or second downlink assignment index, a field of antenna ports, or a field of precoding information and number of layers. For example, for an aperiodic SRS resource set triggering by a DCI in slot n, the aperiodic SRS resource set may be transmitted on the (k+1)-th valid slot counting from slot n, where k may be the value of slot offset indicated by the DCI, or k may be determined by both the value of slot offset indicated by the DCI and the value of slot offset configured by higher layer. Optionally in another implementation, the slot may be considered as valid if there are sufficient available UL symbol(s) for the configured time-domain location(s) in a slot of all the SRS resources. Optionally in another implementation, it may need to satisfy the minimum timing requirement between triggering PDCCH and all the SRS resources in the resource set.

Optionally and/or alternatively in another embodiment, to improve the flexibility of SRS transmission, a UE may be configured with one or more parameter sets. In one implementation, the UE may be configured with a plurality of parameter sets. In another implementation, one of the plurality of the parameter sets may be indicated by at least one of one of the following fields in the DCI: a field of antenna ports, a field of SRS resource indicator, a field of precoding information and number of layers, or a field of HARQ process number.

In another implementation, the plurality of the parameter sets may include at least one of the following parameter sets: a parameter set of SRS-SpatialRelationInfo, a parameter set of SRS-SpatialRelationInfoPos-r16, or a parameter set of transmission configuration indication-state (TCI-State).

For example but not limited to, the parameter set of SRS-SpatialRelationInfo may include the following.

```
SRS-SpatialRelationInfo ::=    SEQUENCE {
    servingCellId              ServCellIndex
    OPTIONAL,   -- Need S
    referenceSignal            CHOICE {
        ssb-Index              ,
        csi-RS-Index               NZP-CSI-RS-ResourceId,
        srs                    SEQUENCE {
            resourceId             SRS-ResourceId,
            uplinkBWP              BWP-Id
        }
    }
}
```

For example but not limited to, the parameter set of SRS-SpatialRelationInfoPos-r16 may include the following.

```
SRS-SpatialRelationInfoPos-r16 ::=   SEQUENCE {
    servingCellId-r16                ServCellIndex
    OPTIONAL,  -- Need S
    referenceSignal-r16              CHOICE {
        ssb-IndexServing-r16             SSB-Index,
        csi-RS-IndexServing-r16          NZP-CSI-RS-ResourceId,
        srs-SpatialRelation-r16          SEQUENCE {
            resourceSelection-r16            CHOICE {
                srs-ResourceId-r16               SRS-ResourceId,
                srs-PosResourceId-r16
            },
            uplinkBWP-r16
        },
        ssbNcell-r16                     BWP-Id
                                         SSB-InfoNcell-r16,
        dl-PRS-r16                       DL-PRS-Info-r16
    }
}
```

For example but not limited to, the parameter set of TCI-State may include the following.

```
TCI-State ::=     SEQUENCE {
    tci-StateId   ,
    qcl-Type1         QCL-Info,
    qcl-Type2         QCL-Info
    OPTIONAL,  -- Need R
    ...
}
```

The present disclosure describes methods, apparatus, and computer-readable medium for wireless communication. The present disclosure addressed the issues with SRS transmission between a UE and a network base station. The methods, devices, and computer-readable medium described in the present disclosure may increase flexibility of SRS transmission and enhance the performance of SRS transmission between a user equipment and a base station, thus improving efficiency and overall performance. The methods, devices, and computer-readable medium described in the present disclosure may improves the overall efficiency of the wireless communication systems.

Reference throughout this specification to features, advantages, or similar language does not imply that all of the features and advantages that may be realized with the present solution should be or are included in any single implementation thereof. Rather, language referring to the features and advantages is understood to mean that a specific feature, advantage, or characteristic described in connection with an embodiment is included in at least one embodiment of the present solution. Thus, discussions of the features and advantages, and similar language, throughout the specification may, but do not necessarily, refer to the same embodiment.

Furthermore, the described features, advantages and characteristics of the present solution may be combined in any suitable manner in one or more embodiments. One of ordinary skill in the relevant art will recognize, in light of the description herein, that the present solution can be practiced without one or more of the specific features or advantages of a particular embodiment. In other instances, additional features and advantages may be recognized in certain embodiments that may not be present in all embodiments of the present solution.

What is claimed is:

1. A method for wireless communication, comprising:
enhancing sounding reference signal (SRS) transmission for a user equipment (UE) by:
receiving, by the UE, downlink control information (DCI) via a physical downlink control channel (PDCCH) from a network base station, the DCI configured to trigger the SRS transmission according to at least one parameter of the SRS transmission,
wherein a first value of a one-bit first field of the DCI indicates that the at least one parameter of the SRS transmission is included in the DCI and a second value of the one-bit first field of the DCI indicates that the at least one parameter of the SRS transmission is included in a higher-layer signaling, and
wherein the DCI comprises a second field associated with uplink-shared channel (UL-SCH) with at least one of following:
a value being equal to "0", wherein the DCI does not contain a channel state information (CSI) request, or
the value being equal to "0", wherein the DCI contains the CSI request.

2. The method according to claim 1, wherein:
the at least one parameter of the SRS transmission comprises at least one of the following:
a cyclic shift,
a transmission comb offset,
a transmission power control (TPC) command,
a slot offset for SRS transmission,
a time domain position of SRS resource,
a frequency domain position of SRS resource,
a set of component carrier (CC) or a set of serving cell for SRS transmission,
a transmission configuration indication for SRS, or
a spatial relation information for SRS transmission.

3. The method according to claim 1, wherein:
the at least one parameter of the SRS transmission is indicated the DCI in response to at least one of the following:
a bit in the DCI being a predefined value,
the DCI having a DCI format with cyclic redundancy check (CRC) scrambled by a predefined radio network temporary identifier (RNTI), or
a third field of modulation and coding scheme satisfying a predefined condition.

4. The method according to claim 3, wherein:
the bit in the DCI is one of the following fourth field in the DCI:
- a field of uplink/supplementary uplink (UL/SUL) indicator,
- a field of frequency hopping flag,
- a field of a priority indicator,
- a field of invalid symbol pattern indicator, or
- a field of minimum applicable scheduling offset indicator; and the predefined value comprises a value of "1" or "0".

5. The method according to claim 3, wherein:
the predefined RNTI comprises a dedicated SRS RNTI (D-SRS-RNTI).

6. The method according to claim 3, wherein:
the predefined condition for the third field of modulation and coding scheme comprises at least one of the following:
- a value of the third field of modulation and coding scheme being non-equal to "00000", or
- the value of the third field of modulation and coding scheme being equal to "00000".

7. The method according to claim 1, wherein:
the DCI comprises at least one of the following fields to indicate the at least one parameter of the SRS transmission:
- a field of modulation and coding scheme used to indicate a slot offset for SRS transmission,
- a field of hybrid automatic repeat request (HARQ) process number used to indicate a cyclic shift for SRS sequence,
- a field of frequency domain resource assignment used to indicate a frequency domain position of SRS,
- a field of time domain resource assignment used to indicate at least one parameter of a time domain position of SRS,
- a field of antenna ports or precoding information and number of layers used to indicate a transmission configuration indication,
- a field of carrier indicator used to indicate a set of component carrier (CC) or a set of serving cell for SRS transmission,
- a field of redundancy version used to indicate a transmission comb offset, or
- a field of TPC command for scheduled physical uplink shared channel (PUSCH) used to indicate a TPC command for SRS.

8. A method for wireless communication, comprising:
enhancing sounding reference signal (SRS) transmission for a user equipment (UE) by:
sending, by a network base station to the UE, downlink control information (DCI) via a physical downlink control channel (PDCCH), the DCI configured to trigger the SRS transmission according to at least one parameter of the SRS transmission,
wherein a first value of a one-bit first field of the DCI indicates that the at least one parameter of the SRS transmission is included in the DCI and a second value of the one-bit first field of the DCI indicates that the at least one parameter of the SRS transmission is included in a higher-layer signaling, and
wherein the DCI comprises a second field associated with uplink-shared channel (UL-SCH) with at least one of following:
- a value being equal to "0" wherein the DCI does not contain a channel state information (CSI) request, or
- the value being equal to "0", wherein the DCI contains the CSI request.

9. The method according to claim 8, wherein:
the at least one parameter of the SRS transmission comprises at least one of the following:
- a cyclic shift,
- a transmission comb offset,
- a transmission power control (TPC) command,
- a slot offset for SRS transmission,
- a time domain position of SRS resource,
- a frequency domain position of SRS resource,
- a set of component carrier (CC) or a set of serving cell for SRS transmission,
- a transmission configuration indication for SRS, or
- a spatial relation information for SRS transmission.

10. The method according to claim 8, wherein:
the at least one parameter of the SRS transmission is indicated the DCI in response to at least one of the following:
- a bit in the DCI being a predefined value,
- the DCI having a DCI format with cyclic redundancy check (CRC) scrambled by a predefined radio network temporary identifier (RNTI), or
- a third field of modulation and coding scheme satisfying a predefined condition.

11. The method according to claim 10, wherein:
the bit in the DCI is one of the following fourth field in the DCI:
- a field of uplink/supplementary uplink (UL/SUL) indicator,
- a field of frequency hopping flag,
- a field of a priority indicator,
- a field of invalid symbol pattern indicator, or
- a field of minimum applicable scheduling offset indicator; and the predefined value comprises a value of "1" or "0".

12. The method according to claim 10, wherein:
the predefined RNTI comprises a dedicated SRS RNTI (D-SRS-RNTI).

13. The method according to claim 10, wherein:
the predefined condition for the third field of modulation and coding scheme comprises at least one of the following:
- a value of the third field of modulation and coding scheme being non-equal to "00000", or
- the value of the third field of modulation and coding scheme being equal to "00000".

14. The method according to claim 8, wherein:
the DCI comprises at least one of the following fields to indicate the at least one parameter of the SRS transmission:
- a field of modulation and coding scheme used to indicate a slot offset for SRS transmission,
- a field of hybrid automatic repeat request (HARQ) process number used to indicate a cyclic shift for SRS sequence,
- a field of frequency domain resource assignment used to indicate a frequency domain position of SRS,
- a field of time domain resource assignment used to indicate at least one parameter of a time domain position of SRS,
- a field of antenna ports or precoding information and number of layers used to indicate a transmission configuration indication,
- a field of carrier indicator used to indicate a set of component carrier (CC) or a set of serving cell for SRS transmission, a field of redundancy version used to indicate a transmission comb offset, or a field of TPC command for scheduled physical uplink shared channel (PUSCH) used to indicate a TPC command for SRS.

15. An apparatus comprising:
a memory storing instructions; and
a processor in communication with the memory, wherein, when the processor executes the instructions, the processor is configured to cause the apparatus to perform enhancing sounding reference signal (SRS) transmission for the apparatus by:
  receiving downlink control information (DCI) via a physical downlink control channel (PDCCH) from a network base station, the DCI configured to trigger the SRS transmission according to at least one parameter of the SRS transmission,
  wherein a first value of a one-bit first field of the DCI indicates that the at least one parameter of the SRS transmission is included in the DCI and a second value of the one-bit first field of the DCI indicates that the at least one parameter of the SRS transmission is included in a higher-layer signaling, and
  wherein the DCI comprises a second field associated with uplink-shared channel (UL-SCH) with at least one of following:
    a value being equal to "0", wherein the CI does not contain a channel state information (CSI) request, or
    the value being equal to "0", wherein the DCI contains the CSI request.

16. The apparatus according to claim 15, wherein:
the at least one parameter of the SRS transmission is indicated the DCI in response to at least one of the following:
  a bit in the DCI being a predefined value,
  the DCI having a DCI format with cyclic redundancy check (CRC) scrambled by a predefined radio network temporary identifier (RNTI), or
  a third field of modulation and coding scheme satisfying a predefined condition.

17. An apparatus comprising:
a memory storing instructions; and
a processor in communication with the memory, wherein, when the processor executes the instructions, the processor is configured to cause the apparatus to perform enhancing sounding reference signal (SRS) transmission for a user equipment (UE) by:
  sending, to the UE, downlink control information (DCI) via a physical downlink control channel (PDCCH), the DCI configured to trigger the SRS transmission according to at least one parameter of the SRS transmission,
  wherein a first value of a one-bit first field of the DCI indicates that the at least one parameter of the SRS transmission is included in the DCI and a second value of the one-bit first field of the DCI indicates that the at least one parameter of the SRS transmission is included in a higher-layer signaling, and
  wherein the DCI comprises a second field associated with uplink-shared channel (UL-SCH) with at least one of following:
    a value being equal to "0" 2 wherein the DCI does not contain a channel state information (CSI) request, or
    the value being equal to "0", wherein the DCI does contains the CSI request.

18. The apparatus according to claim 17, wherein:
the at least one parameter of the SRS transmission is indicated the DCI in response to at least one of the following:
  a bit in the DCI being a predefined value,
  the DCI having a DCI format with cyclic redundancy check (CRC) scrambled by a predefined radio network temporary identifier (RNTI), or
  a third field of modulation and coding scheme satisfying a predefined condition.

* * * * *